(12) United States Patent
Juan et al.

(10) Patent No.: US 8,665,234 B2
(45) Date of Patent: Mar. 4, 2014

(54) IN CELL TOUCH PANEL

(75) Inventors: Yi-Chung Juan, Kaohsiung (TW); Hsuan-Chen Liu, Kaohsiung (TW); Sung-Chun Lin, Tainan (TW); Wen-Chi Lin, Hsinchu County (TW)

(73) Assignee: HannStar Display Corp., New Taipei (TW)

( * ) Notice: Subject to any disclaimer, the term of this patent is extended or adjusted under 35 U.S.C. 154(b) by 364 days.

(21) Appl. No.: 13/117,019

(22) Filed: May 26, 2011

(65) Prior Publication Data

US 2012/0127121 A1     May 24, 2012

(30) Foreign Application Priority Data

Nov. 22, 2010    (TW) ................................ 99140153 A

(51) Int. Cl.
*G06F 3/041*      (2006.01)
*G06F 3/045*      (2006.01)
*G06F 3/042*      (2006.01)

(52) U.S. Cl.
USPC .......................... 345/173; 345/174; 345/175

(58) Field of Classification Search
USPC ......................................... 345/173, 174, 175
See application file for complete search history.

(56) References Cited

U.S. PATENT DOCUMENTS

| | | | |
|---|---|---|---|
| 2007/0205999 A1* | 9/2007 | Akimoto et al. | 345/207 |
| 2009/0237369 A1* | 9/2009 | Hur et al. | 345/173 |
| 2011/0090174 A1* | 4/2011 | Lin | 345/174 |
| 2011/0096017 A1* | 4/2011 | Li et al. | 345/174 |

* cited by examiner

*Primary Examiner* — Aneeta Yodichkas
(74) *Attorney, Agent, or Firm* — Stout, Uxa, Buyan & Mullins, LLP

(57) ABSTRACT

Embodiments of the present invention employ resistance compensation to broaden voltage reading range of readout lines connected to a processing chip of an in cell touch panel. The resolution of the in cell touch panel is increased under the condition that the number of pins of the processing chip is not increased or is unchanged.

13 Claims, 9 Drawing Sheets

IN CELL TOUCH PANEL

CROSS-REFERENCE TO RELATED APPLICATIONS

The entire contents of Taiwan Patent Application No. 099140153, filed on Nov. 22, 2010, from which this application claims priority, are incorporated herein by reference.

BACKGROUND OF THE INVENTION

1. Field of the Invention

The present invention relates to an in cell touch panel, more particularly, to an in cell touch panel with high resolution.

2. Description of Related Art

Displays with touch control functions are popularized nowadays. Typically a display realizes its touch control function by employing a touch panel whose working type may include resistance, capacitance, infrared ray, or surface acoustic wave.

FIG. 1 illustrates a display 16 employing an additional resistance type of touch panel 10, which comprises a polymer substrate 11, a glass substrate 12, two conductive circuits 13 whose surface coated with indium tin oxide (ITO) 14 respectively arranged on the conductive circuit and between the two substrates 11/12, and many spacers 15 arranged between the two ITO 14 coatings. As shown in FIG. 1, when the user presses the polymer substrate 11 at a position, the route resistance and the measured voltage will be changed; accordingly the touching position can be estimated.

The manufacturing processes of the resistance type of touch panel are simple; however, the additional touch panel may affect the optical performance and increase the manufacturing cost of the display. A so-called "In cell touch panel" is developed to overcome these problems because its structure can comply with the structure of the active matrix display so that the manufacturing steps can be reduced.

FIG. 2 shows a conventional in cell touch panel disclosed by Taiwan Patent Application No, 200729121. The in cell touch panel includes a thin-film transistor substrate 20, a color filter substrate 21, and a liquid crystal 22 arranged between the two substrates 20/21. In addition, a plurality of lower protrusions 23 and pixel components (not shown) such as gate lines, data lines, and thin film transistors are formed on the thin-film transistor substrate 20 and sensing lines 24 such as indium tin oxide (ITO) are formed on the lower protrusions 23. The lower protrusions 23 may be formed in a same manufacturing step with gate lines or data lines. In addition, black matrixes 25, color filters 26 are formed on the color filter substrate 21, upper protrusions 27 are formed on a portion of the black matrixes 25, and a common electrode 28 is formed to cover the color filters 26, the black matrixes 25, the upper protrusions 27, and the color filter substrate 21.

Accordingly, the upper protrusion 27, the common electrode 28, the lower protrusion 23, and the sensing line 24 construct a sensing element/unit. When the user presses the surface of the sensing element to make the common electrode 28 and the sensing line 24 in contact, the input voltage Vcom of the common electrode 28 can be readout via the sensing line 24 to a sensing signal processor (not shown); therefore the touch position can be estimated.

However, the number of the sensing lines must be increased if the resolution of the in cell touch panel are needed to be promoted. The layout area limits the number of the sensing lines, and the number of the processor or the pins of the sensing signal processor must be increased in response, resulting in high cost.

Therefore, it would be advantageous to provide an in cell touch panel with promoted resolution achieved under the low cost condition.

SUMMARY OF THE INVENTION

An object of the present invention is to provide an in cell touch panel with promoted resolution achieved under the low cost condition.

According to the object, one embodiment of the present invention provides an in cell touch panel having a thin-film transistor substrate, an upper substrate, and a liquid crystal arranged between the two substrates, characterized in that the in cell touch panel further comprises a sensing signal processor comprising a plurality of pins, each of the plurality of pins connecting to a readout line, which connects to first ends of a plurality of sub-readout lines, whose second ends respectively connect an input end of a series resistor, whose output end respectively connects a plurality of sensing lines, which respectively connect to a plurality of sensing elements, wherein the sensing lines are arranged between the two substrates, and the series resistors connected to different sub-readout lines connected to the same readout line have different resistances with each other.

The embodiment employs resistance compensation to broaden voltage reading range of readout lines connected to a processing chip of an in cell touch panel. The resolution of the in cell touch panel is increased under the condition that the number of pins of the processing chip is unchanged.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except when expressly restricting the amount of the components.

Figure 1:
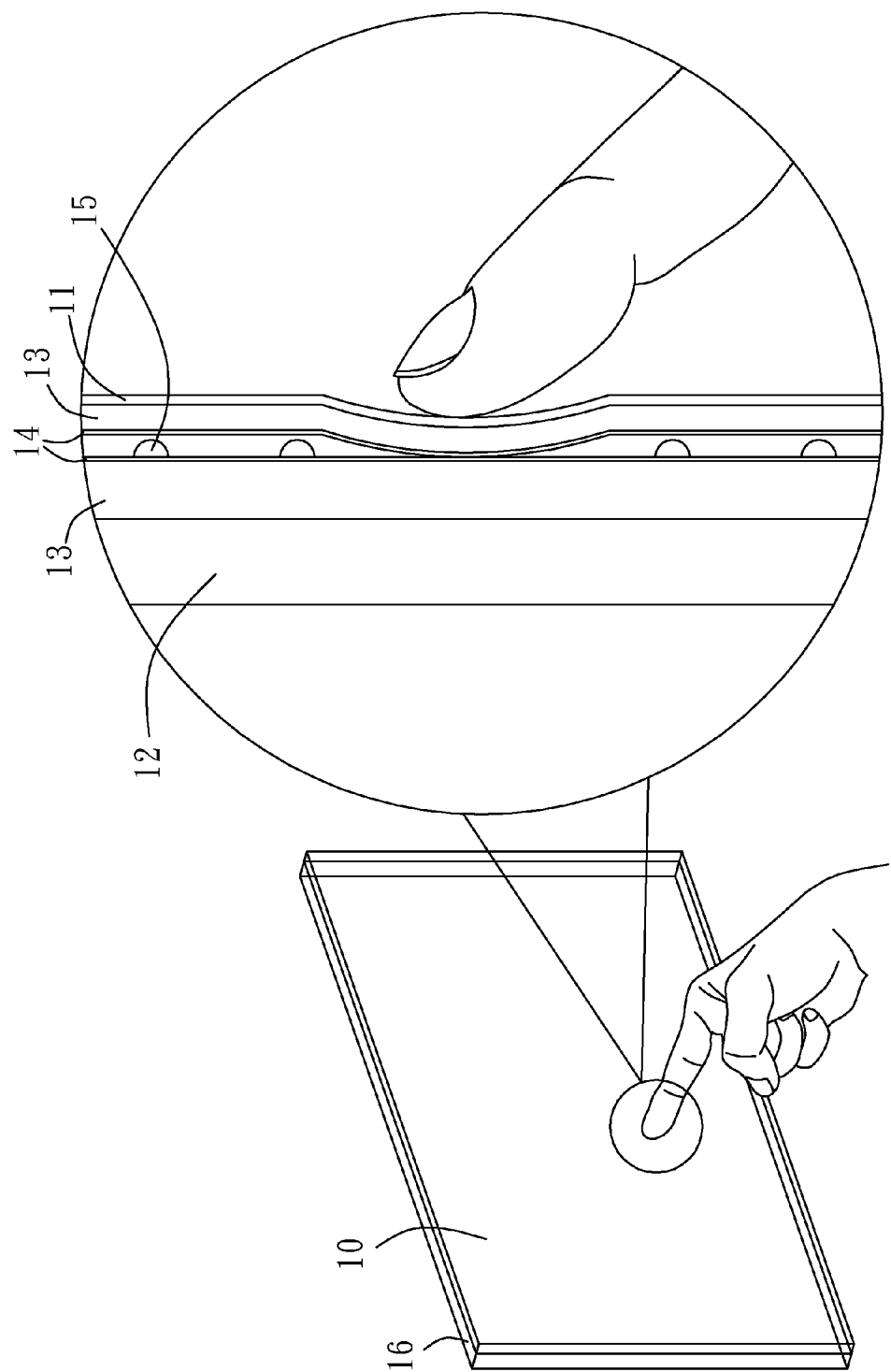
FIG. 1 illustrates a conventional display employing an additional resistance type of touch panel.
Figure 2:
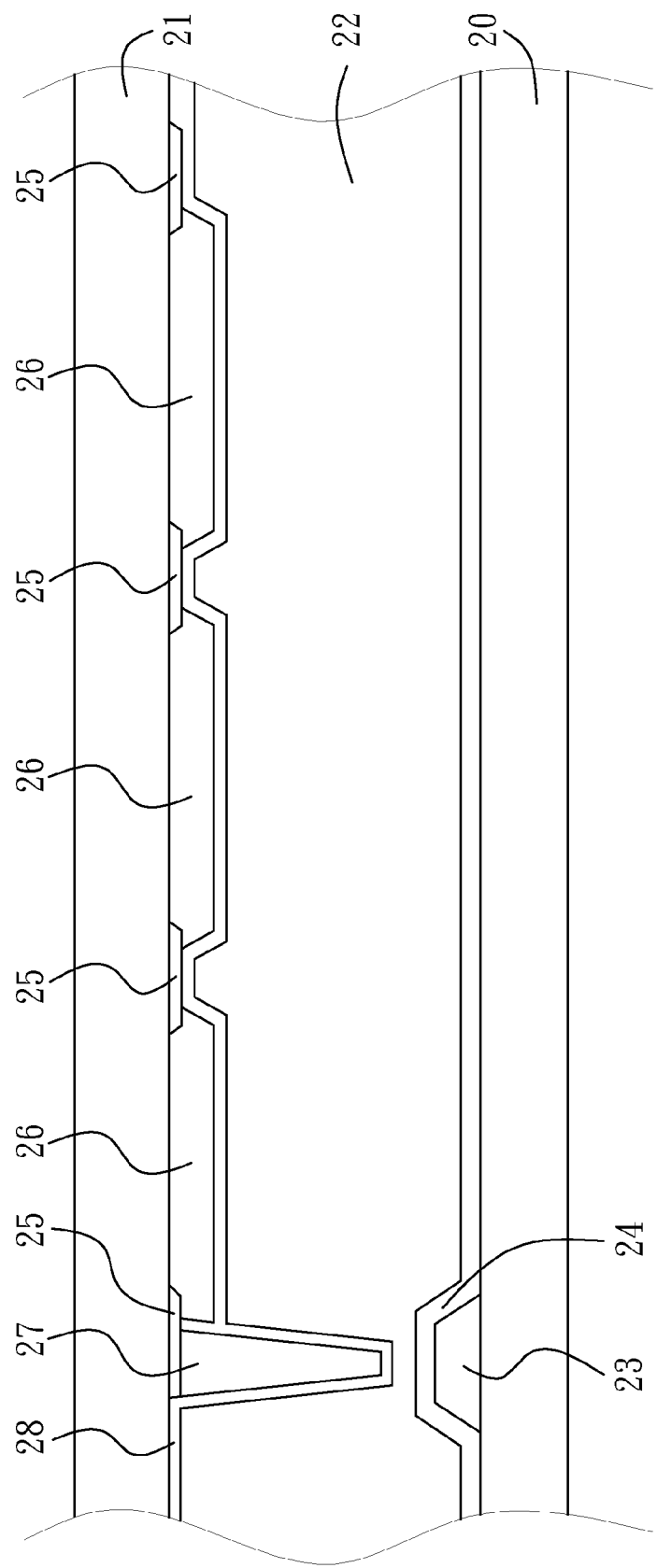
FIG. 2 shows a conventional in cell touch panel disclosed by Taiwan Patent Application No. 200729121.
Figure 3:
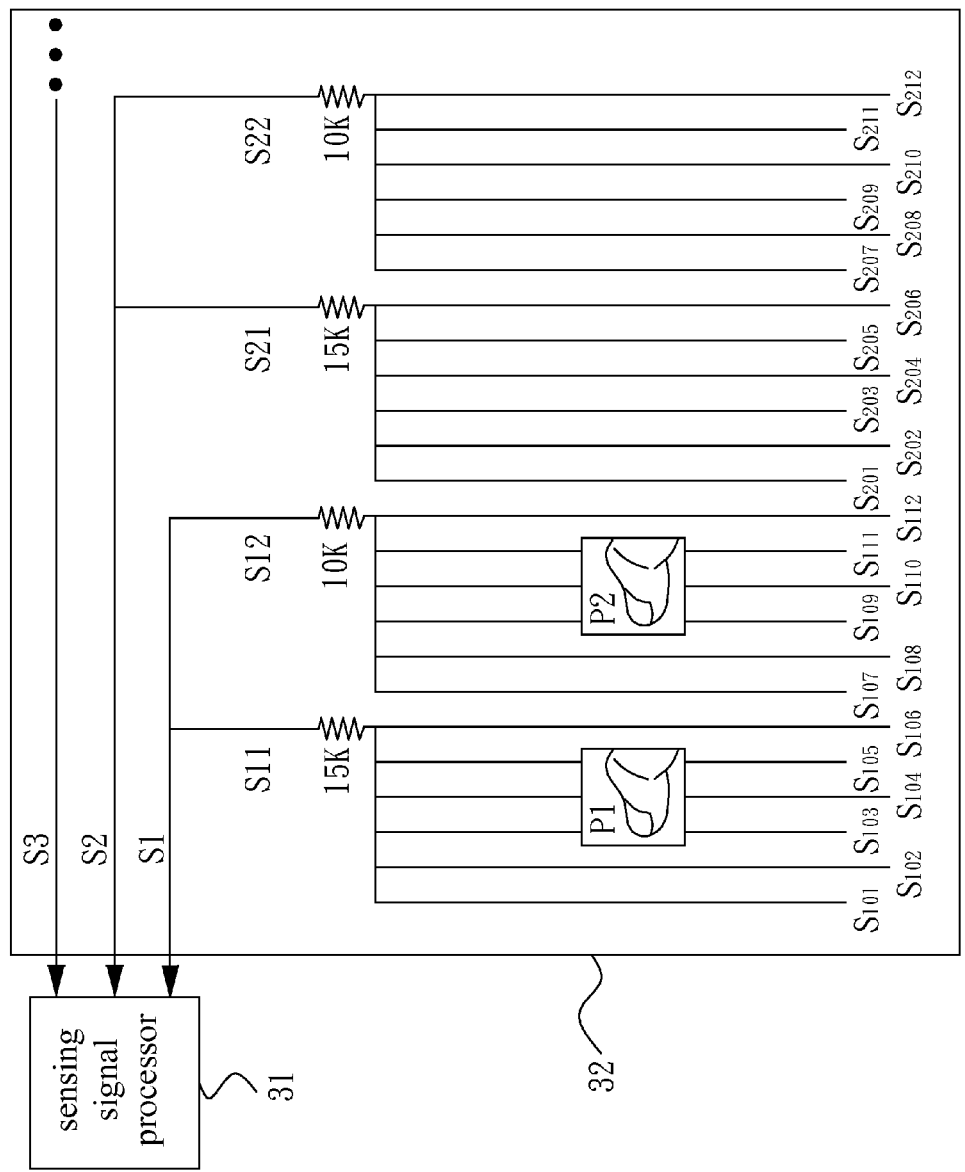
FIG. 3 shows an in cell touch panel according to an embodiment of this invention.
Figure 10:
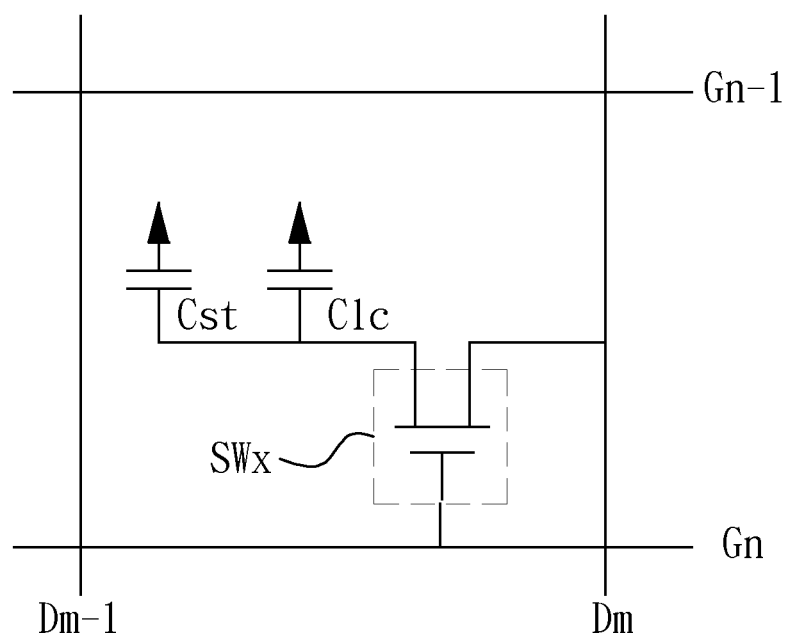
FIG. 10 illustrates some pixel elements omitted in FIG. 3.

FIG. 3 shows an in cell touch panel according to an embodiment of this invention. Although this embodiment illustrates a resistance type of touch panel, other types of touch panel may be used in other embodiments of this invention. As shown in FIG. 3, an in cell touch panel 30 comprises a sensing signal processor 31, which comprises a plurality of pins (not shown) respectively connected with a readout line such as S1, S2, and S3. Each readout line connects two sub-readout lines. For example, readout line S1 connects sub-readout line S11 and S12, and readout line S2 connects sub-readout line S21 and S22. Each sub-readout line may connect six sensing lines. For example, sub-readout line S11 connects sensing lines S101-S106, and sub-readout line S12 connects sensing lines S107-S112. In addition, each sensing line (S101 . . . S106 or S107 . . . S112) connects with at least a sensing element (not shown), and a series resistor is arranged between each sub-readout line and its connected sensing lines, wherein the sub-readout lines branched from the same readout line respectively connects to a resistor having different resistance. For example, sub-readout lines S11 and S12 are branched from the same readout line S1, a series resistor 15K (resistance) is arranged between sub-readout line S11 and its connected sensing lines S101-S106, and another series resistor 10K (resistance) is arranged between sub-readout line S12 and its connected sensing lines S107-S112. The readout lines, the sub-readout lines, the series resistors, and the sensing lines are made on the thin-film transistor substrate 32 of the in cell touch panel 30. Notice that other pixel elements such as data lines and gate lines are omitted for simplicity. FIG. 10 illustrates some pixel elements omitted in FIG. 3 in which two gate lines Gn−1/Gn and two data lines Dm−1/Dm constructing a (sub) pixel that includes a liquid crystal capacitance Clc, a storage capacitance Cst, and a pixel transistor SWx for writing a pixel voltage. Referring back to FIG. 3, the thin-film transistor substrate 32 consists of a pixel array, and the foregoing sensing elements/units are regularly arranged in some pixels of the pixel array. The color filter substrate corresponded to the thin-film transistor substrate 32 is also omitted for the same reason. In this embodiment, the sub-readout lines and their corresponding connected sensing lines are arranged substantially parallel to the data lines of the thin-film transistor substrate 32, and the readout lines are arranged substantially parallel to the gate lines of the thin-film transistor substrate 32.

Figure 4:
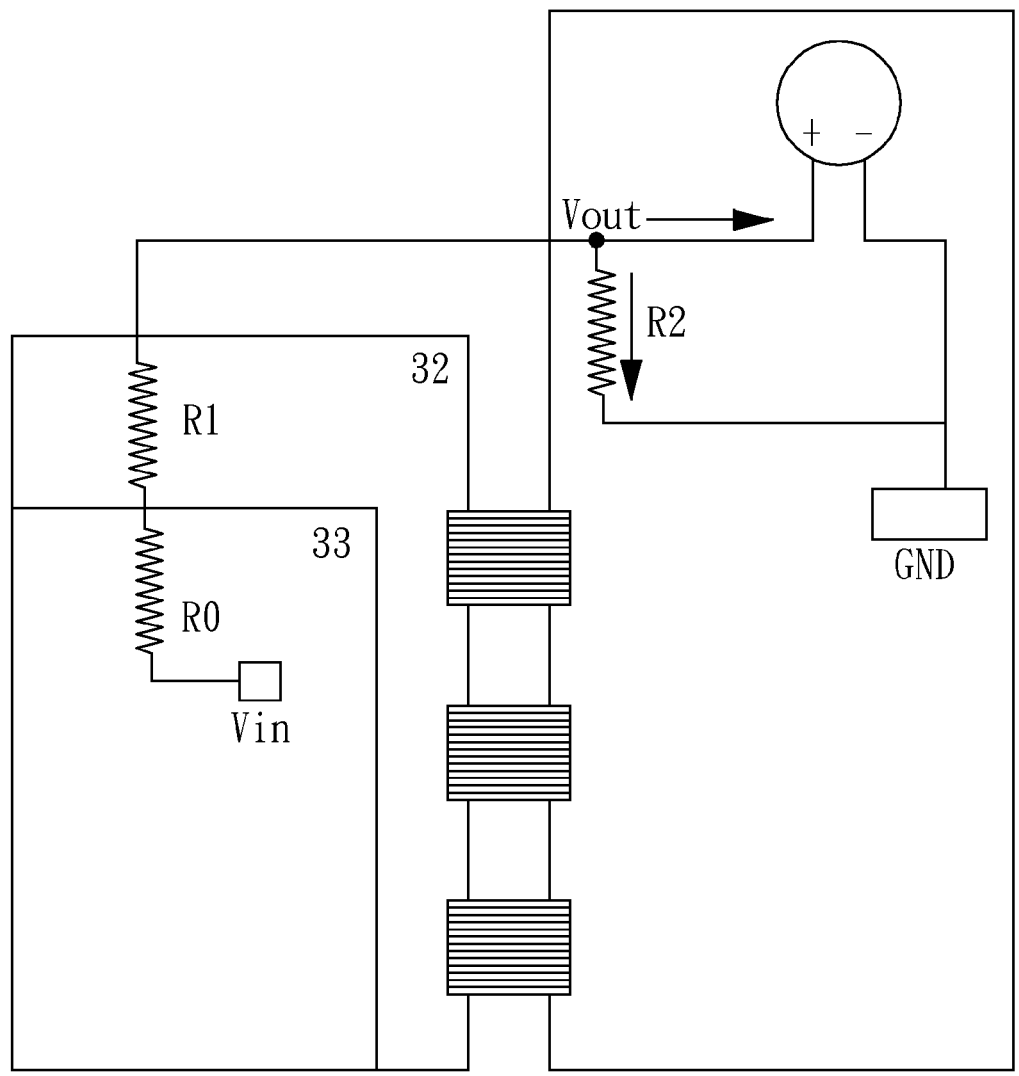
FIG. 4 illustrates a circuit diagram showing how a touch signal is sensed and transmitted according to an embodiment of this invention.

The structure shown in FIG. 3 is superior than the prior art in that the number of the sensing line is increased and hence the resolution of the touch panel can be increased one or more times, but the number of the pins of the sensing signal processor is unchanged. For example, in the prior art one readout line may connect to six sensing lines; in this embodiment, one readout line can connect twelve or more sensing lines. FIG. 4 illustrates a circuit diagram showing how a touch signal is sensed and transmitted according to an embodiment of this invention. When the user presses the touch panel at a point, the sensing line connected to this point will have a voltage Vin, which may equal to the voltage of the common electrode Vcom. The voltage (Vout) outputted to and received by the sensing signal processor can be estimated by the voltage divider rule as follows:

$$Vout = \frac{R2}{R0 + R1 + R2} Vin,$$

wherein R0 is the resistance of the sensing line, R1 is the resistance of the series resistor (S11 or S12), and R2 is the resistance of a match resistor, which can be a constant resistor or a variable resistor. The match resistor R2 is series connected to readout lines and arranged in the circuit of the sensing signal processor 31 or arranged in a circuit board of the thin-film transistor substrate 32, for example.

Referring to FIG. 3 again, when the user respectively presses the point P1 and P2, the corresponding voltages Vout,1 and Vout,2 transmitted to the sensing signal processor 31 are respectively estimated as follows (with assumptions both R0 of the two sensing lines is 1K, R1 are 15K and 10K respectively, R2 is 20K, and Vin is 5V):

$$Vout, 1 = \frac{R2}{R0 + R1 + R2} Vin = \frac{15}{1 + 15 + 20} \times 5 = 2.08 \text{ V},$$

and $$Vout, 2 = \frac{R2}{R0 + R1 + R2} Vin = \frac{10}{1 + 10 + 20} \times 5 = 1.62 \text{ V}.$$

Taking an 8 bit sensing signal processor as example, its sensitivity is about 0.02V, indicating that the voltage difference between Vout, 1 and Vout, 2 should be at least 0.02V or more. The voltage difference between Vout, 1 and Vout, 2 is 0.46V (2.08V−1.62V=0.46V) in this example, which means that the two voltages Vout, 1 and Vout, 2 are distinguishable from each other and the voltage difference 0.46V is far higher than the general sensitivity request voltage 0.02V. Hence, under the condition that the number of the pins of the sensing signal processor 31 is unchanged or not increased, the increasing sensing lines therefore make the resolution double of that of the prior art. Notice that the voltage difference transmitted from different sensing lines, for example the voltage difference between the sub-readout line S11 and S12 is greater than 0.02V, should be sufficient to be distinguishable by the sensing signal processor, which means that the sensing signal processor can recognize which sub-readout line has been touched; if the voltage difference is not great enough, it can be achieved or improved, for example, by selecting the resistance of the match resistor R2. In this embodiment, one end of the match resistor R2 is grounded, and the resistance R2 relates to the resistance of the series resistor and the sensing line, i.e., R1 and R0. Typically the sensing line resistance R0 relates to the size of the in cell touch panel and the material of the sensing lines; however, usually the resistance R0 is markedly smaller than R1 and R2. For example, the smallest resistance of R1 may be set to be greater than 5 times or more of R0, and the resistance of R2 may be set to be 2-10 times of the smallest R1. In an embodiment, the smallest resistance of R1 is preferably greater than 10 times or more of R0, and the resistance of R2 is 2-5 times of the smallest R1.

By using the same theory described in the above embodiment, each pin of the sensing signal processor connects to a readout line, and each readout line connects to N sub-readout lines, wherein N is positive integer equal to or greater than 2. In addition, each sub-readout line connects to an output end of a series resistor, whose input end connects to a plurality of sensing lines and each sensing line connects to a plurality of sensing element. By doing so, the resolution of the in cell touch panel can be promoted by N times.

Figure 5:
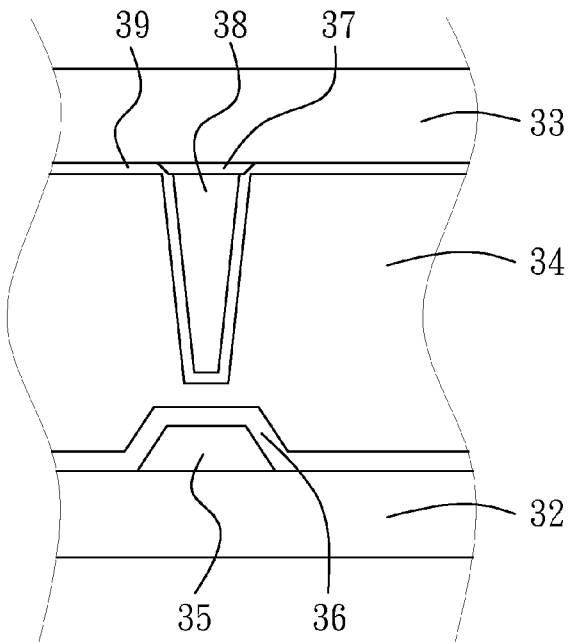
FIG. 5 illustrates a resistance type of sensing element employed by an in cell touch panel of an embodiment of this invention.

FIG. 5 illustrates a resistance type of sensing element employed by an in cell touch panel of an embodiment of this invention. As shown in FIG. 5, a touch panel 30 includes a thin-film transistor substrate 32, an upper substrate 33, and a liquid crystal 34 arranged between the two substrates 32/33. In addition, a plurality of lower protrusions 35 and pixel components such as gate lines, data lines, and thin film transistors (not shown) are formed on the thin-film transistor substrate 32 and sensing lines 36 comprising indium tin oxide (ITO) or other conducting materials are formed on the lower protrusions 35. The lower protrusions 35 may be formed in a same manufacturing step with gate lines or data lines. In addition, black matrixes 37 are formed on the upper substrate 33, upper protrusions 38 are formed on the black matrixes 37 or other positions of the upper substrate 33, and a common electrode 39 is formed to cover the black matrixes 37, the upper protrusions 38, and the upper substrate 33. As shown in FIG. 5, the position of the upper protrusion 38 is corresponding to that of the lower protrusion 35. In addition, a plurality of spacers (not shown) may be arranged between the thin-film transistor substrate 32 and the upper substrate 33.

Accordingly, the upper protrusion 38, the common electrode 39, the lower protrusion 35, and the sensing line 36 construct a sensing element/unit. When the user presses the sensing element/unit, the input voltage of the common electrode 39 Vcom is readout via the sensing line 36 to the sensing signal processor 31 (shown in FIG. 3).

Figure 6:
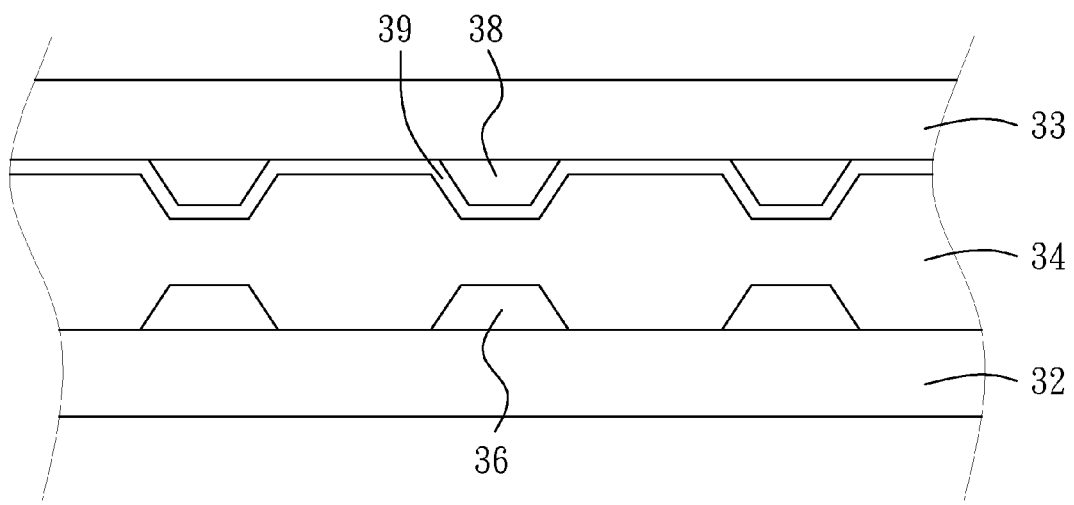
FIG. 6 illustrates a capacitance type of sensing element employed by an in cell touch panel of an embodiment of this invention.

FIG. 6 illustrates a capacitance type of sensing element employed by an in cell touch panel of an embodiment of this invention. As shown in FIG. 6, a touch panel 30 includes a thin-film transistor substrate 32, an upper substrate 33, and a liquid crystal 34 arranged between the two substrates 32/33. In addition, a plurality of sensing lines 36 comprising indium tin oxide (ITO) or other conducting materials and pixel components such as gate lines, data lines, and thin film transistors (not shown) are formed on the thin-film transistor substrate 32. A driver (not shown) provides voltage to the sensing lines 36. In addition, upper protrusions 38 are formed on the upper substrate 33, and a common electrode 39 is formed to cover the upper protrusions 38 and the upper substrate 33. In addition, a plurality of spacers (not shown) may be arranged between the thin-film transistor substrate 32 and the upper substrate 33. Accordingly, the upper protrusion 38, the common electrode 39, and the sensing line 36 construct a sensing element/unit. When the user presses the sensing element (presses the upper substrate 33), the capacitance between the sensing line 36 and the common electrode 39 is changed, and hence the voltage transmitted from the sensing line 36 to the sensing signal processor 31 (shown in FIG. 3) is changed as well.

The capacitance between the sensing line 36 and the common electrode 39 relates to the dielectric constant of the liquid crystal 34, the area of the sensing line 36, and the distance between the sensing line 36 and the common electrode 39. In this embodiment, the common electrode 39 and the sensing line 36 are unnecessary to contact each other during the operation; instead, the capacitance change is due to the distance change between them. Compared to the contact type of sensing element shown in FIG. 5, the sensing element/unit shown in FIG. 6 is a non-contact type of sensing element.

Figure 7:
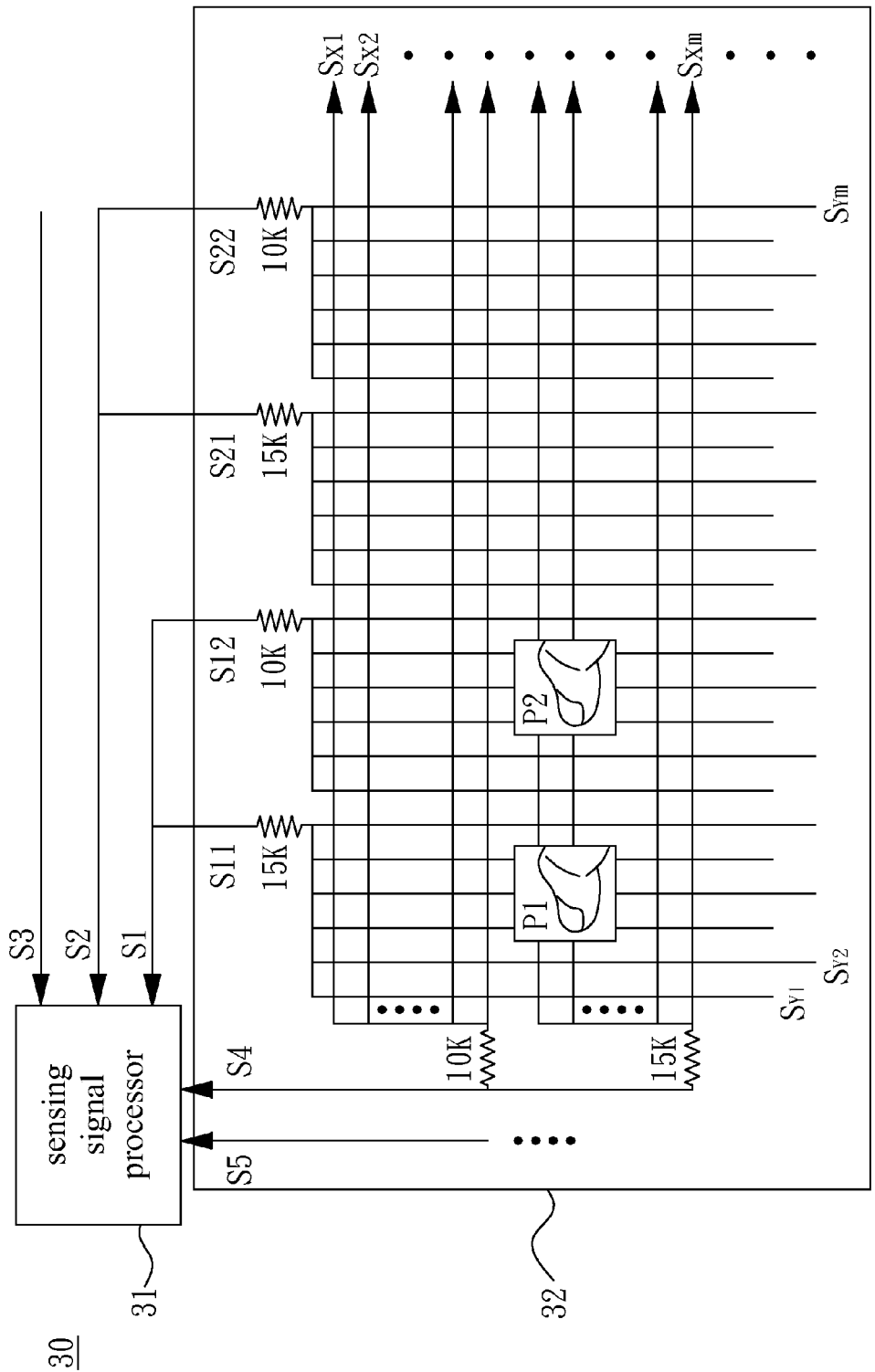
FIG. 7 shows an in cell touch panel according to another embodiment of this invention in which the sensing elements shown in FIG. 5 or FIG. 6 are employed.

FIG. 7 shows an in cell touch panel according to another embodiment of this invention in which the sensing elements shown in FIG. 5 or FIG. 6 are employed. In this embodiment, the sensing lines are divided into x-directional sensing line ($SX_1$ to $SX_m$) and y-directional sensing line ($SY_1$ to $SY_m$). The y-directional sensing lines are arranged substantially parallel to the data lines and used for detecting the x-coordinate of a touch point. The x-directional sensing lines are arranged substantially parallel to the gate lines and used for detecting the y-coordinate of a touch point. Notice that in this embodiment, if a pixel unit (including R, G, B totally three sub-pixels) is assigned to be have sensing element(s) in it, typically two sensing elements are arranged in which one for x-coordinate (SY) and the other for y-coordinate (SX) detection. In addition, the SY and SX sensing lines are respectively arranged in different layers and an insulating layer disposed between them.

Figure 8:
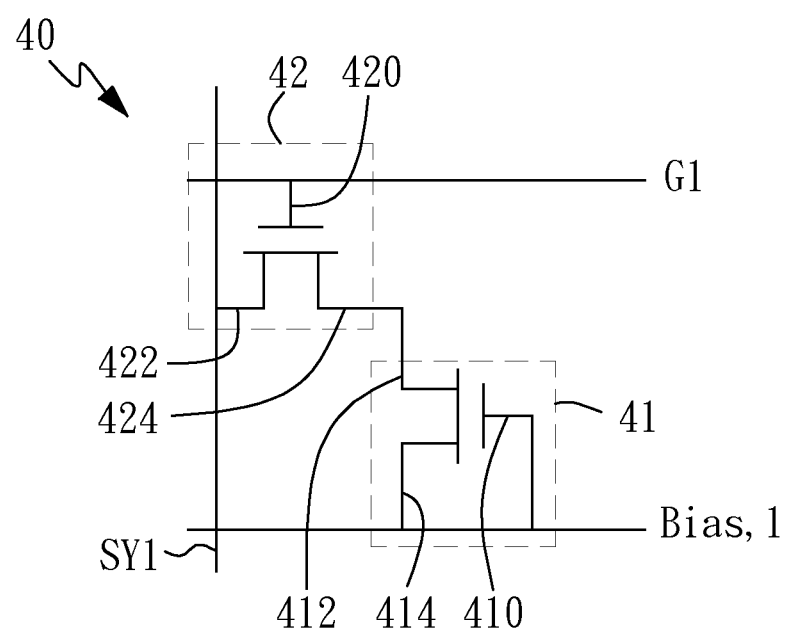
FIG. 8 illustrates a photosensitive type of sensing element employed by an in cell touch panel according to an embodiment of this invention.

FIG. 8 illustrates a photosensitive type of sensing element employed by an in cell touch panel according to an embodiment of this invention. The photosensitive type of sensing element 40 includes a photo thin-film transistor 41 and a switch thin-film transistor 42, which may be not the typical pixel switch for controlling the pixel voltage. The switch thin-film transistor 42 has a source 422 connecting to a sensing line SY1, a gate 420 connecting to a gate line G1, and a drain 424 connecting to a source 412 of the photo thin-film transistor 41. In addition, a gate 410 and a drain 414 of the photo thin-film transistor connect to a bias line Bias, 1, which provides a bias voltage to the photo thin-film transistor 41. When the switch thin-film transistor 42 is open, the photo-induced current generated by the photo thin-film transistor 41 due to the user's pressing is readout via the sensing line SY1.

Figure 9:
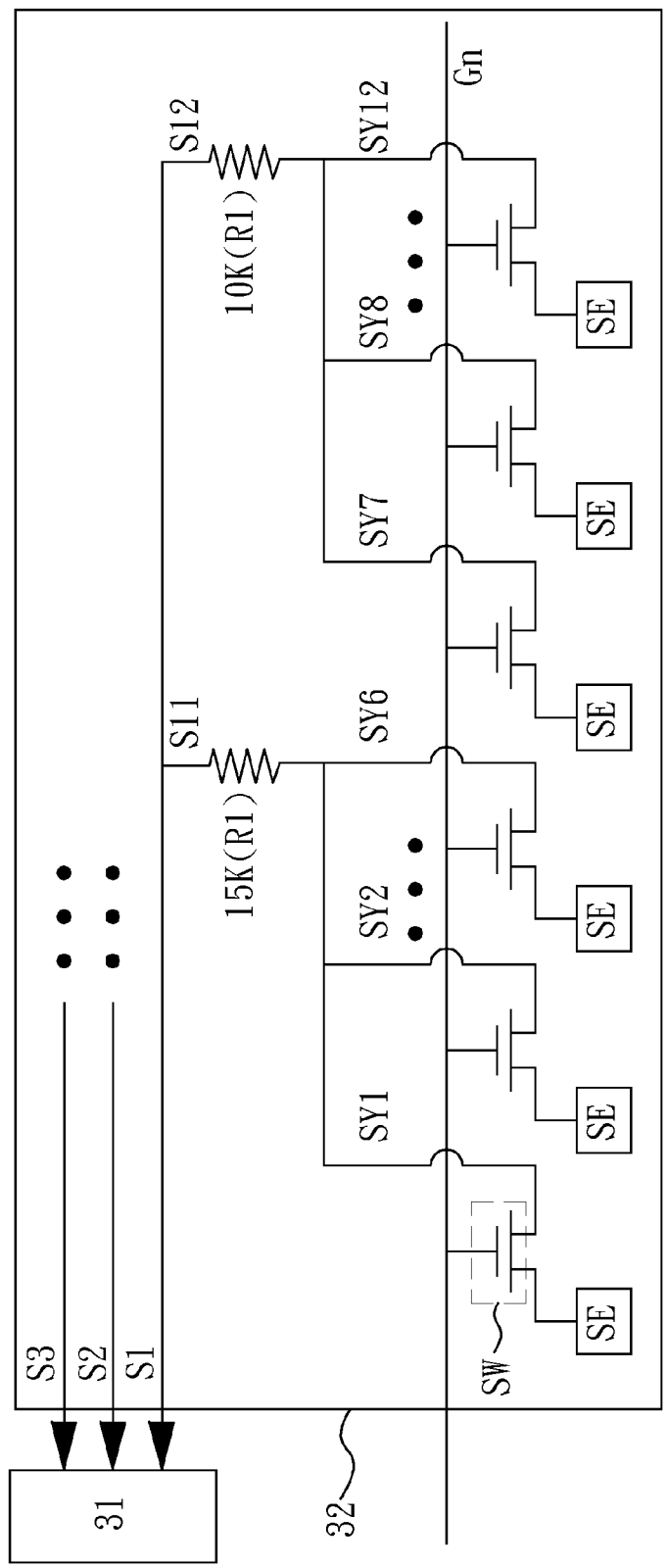
FIG. 9 shows an in cell touch panel according to another embodiment of this invention.

FIG. 9 shows an in cell touch panel according to another embodiment of this invention. As shown in FIG. 9, the symbol SE denotes a sensing element/unit such as those described in FIG. 5, FIG. 6, and FIG. 8 (the photo thin-film transistor). The sensing element SE connects to the sensing line such as SY1 through a switch thin-film transistor SW, which may be not typical pixel switch for controlling the pixel voltage. The sensing line SY1 has a resistance R0. Similarly, each readout line (such as S1) is branched to two (or more) sub-readout lines (such as S11, S12), each sub-readout line (such as S11) connects to several sensing lines (such as SY1 to SY6) through a series resistor (such as R1, 15K), and each sensing line connects to one sensing element SE. A gate of the switch thin-film transistor SW connects to a gate line (such as Gn), which may connect to a plurality of pixel thin-film transistor/pixel switch (not shown) as well. Scanning voltages are sequentially provided to gate lines. When scanning voltage is provided to a gate line (such as Gn), the sensing signal of the sensing element SE is readout via the sensing line (such as SY1). This embodiment features in that x-directional sensing lines (those SX1, SX2 . . . SXm shown in FIG. 7) can be omitted because the y-coordinate detection of the touch point is replaced by the cooperation of the sequentially scanned gate lines and sensing elements SE. In other words, the sensing signal processor 31 or other processing processors in the panel will recognize which gate line being driven now and simultaneously recognize which sub-readout lines being pressed, such that the touching position/coordinate is detected.

Except those sensing elements/units shown in FIG. 5, FIG. 6, and FIG. 8, this invention may employ other sensing elements/units having same sensing mechanism or structure in other embodiments.

Summarily, the invention is characterized in that a touch panel comprises a sensing signal processor having a plurality of pins; a plurality of readout lines, one end of each the readout line is connected to one of the pins and the other end is connected with at least a first sub-readout line and a second sub-readout line. And the touch panel further comprises a first series resistor and a second series resistor, one ends of the first and second series resistors are respectively connected to different the sub-readout lines, and the other ends of the first and second series resistors are respectively connected to different a plurality of sensing lines which are arranged between the two panel substrate, wherein each of the sensing lines is connected to at least one corresponding sensing element in the thin-film transistor substrate, and the first series resistor and the second series resistor have different resistances with each other.

Accordingly, embodiments of this invention employ resistance compensation (such as R2) to broaden voltage reading range of readout lines connected to the processing chip of the in cell touch panel, and the resolution of the in cell touch panel is increased under the condition that the number of pins of the processing chip is not increased or is unchanged.

Although specific embodiments have been illustrated and described, it will be appreciated by those skilled in the art that various modifications may be made without departing from the scope of the present invention, which is intended to be limited solely by the appended claims.

What is claimed is:

1. An in cell touch panel having a thin-film transistor substrate, an upper substrate, and a liquid crystal arranged between the two substrates, the in cell touch panel further comprising:
   a sensing signal processor having a plurality of pins;
   a plurality of readout lines, wherein one end of each readout line is connected to one of the pins and the other end is connected with at least a first sub-readout line and a second sub-readout line;
   a first series resistor and a second series resistor, wherein one ends of the first and second series resistors are respectively connected to different the sub-readout lines, and the other ends of the first and second series resistors are respectively connected to different a plurality of sensing lines which are arranged between the two substrates, wherein each of the sensing lines is connected to at least one corresponding sensing element in the thin-film transistor substrate, and the first series resistor and the second series resistor have different resistances with each other; and
   a match resistor whose one end being grounded and the other end being connected with a corresponding readout line, wherein the smallest resistance of the series resistors is greater than 5 times or more of the resistance of the sensing line, and the resistance of the match resistor is 2-10 times of the smallest resistance of the series resistors.

2. The in cell touch panel as recited in claim 1, wherein the sensing element is resistance type.

3. The in cell touch panel as recited in claim 2, wherein each of the resistance type of sensing element comprises a lower protrusion arranged on the thin-film transistor substrate, one of the sensing lines arranged on the lower protrusion, a black matrix arranged on the upper substrate, an upper protrusion arranged on the black matrix, a common electrode formed to cover the black matrix, the upper protrusion, and the upper substrate, and the position of the lower protrusion is corresponding to that of the upper protrusion.

4. The in cell touch panel as recited in claim 2, wherein the sensing lines are divided into x-directional sensing lines and y-directional sensing lines for respectively detecting the y-coordinate and x-coordinate of a touch point by the user.

5. The in cell touch panel as recited in claim 1, wherein the sensing elements are capacitance type.

6. The in cell touch panel as recited in claim 5, wherein each of the capacitance type of sensing element comprises one of the sensing lines arranged on the thin-film transistor substrate, an upper protrusion arranged on the upper substrate, and a common electrode formed to cover the upper protrusion and the upper substrate, when the user presses the sensing element to make the capacitance between the common electrode and the sensing line altered, the voltage of the sensing line transmitted to the sensing signal processor is changed.

7. The in cell touch panel as recited in claim 5, wherein the sensing lines are divided into x-directional sensing lines and y-directional sensing lines for respectively detecting the y-coordinate and x-coordinate of a touch point by the user.

8. The in cell touch panel as recited in claim 1, wherein the sensing elements are photosensitive type.

9. The in cell touch panel as recited in claim 8, wherein each of the photosensitive type of sensing element comprises a photo thin-film transistor and a switch thin-film transistor, the source of the switch thin-film transistor connects to one of the sensing lines, the gate of the thin-film transistor connects to a gate line, the drain of the switch thin-film transistor connects to the source of the photo thin-film transistor, and the gate and the drain of the photo thin-film transistor connects to a bias line, which provides a bias voltage to the photo thin-film transistor.

10. The in cell touch panel as recited in claim 1, wherein the resistance of the series resistor is determined by the resistance of its connected sensing line.

11. The in cell touch panel as recited in claim 1, wherein the resistance of the sensing lines are determined by the size of the in cell touch panel and the material of the sensing lines.

12. The in cell touch panel as recited in claim 1, wherein the smallest resistance of the series resistors is greater than 10 times or more of the resistance of the sensing line, and the resistance of the match resistor is 2-5 times of the smallest resistance of the series resistors.

13. The in cell touch panel as recited in claim 1, wherein the sensing lines are y-directional sensing lines, the thin-film transistor substrate comprises a plurality of gate lines respectively connected to a plurality of pixel thin-film transistors and a plurality of switch transistors, and one end of each switch transistor connects to one of the sensing elements, so that the x-coordinate and y-coordinate of a touch point can be determined.

* * * * *